Nov. 1, 1938.   V. L. BENDSIL ET AL   2,135,161
ROTARY FLUID MOTOR
Filed Nov. 20, 1936   2 Sheets-Sheet 1
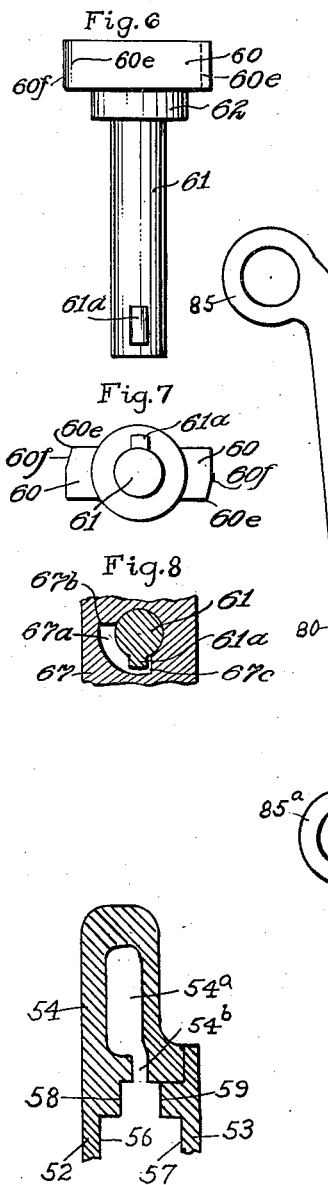
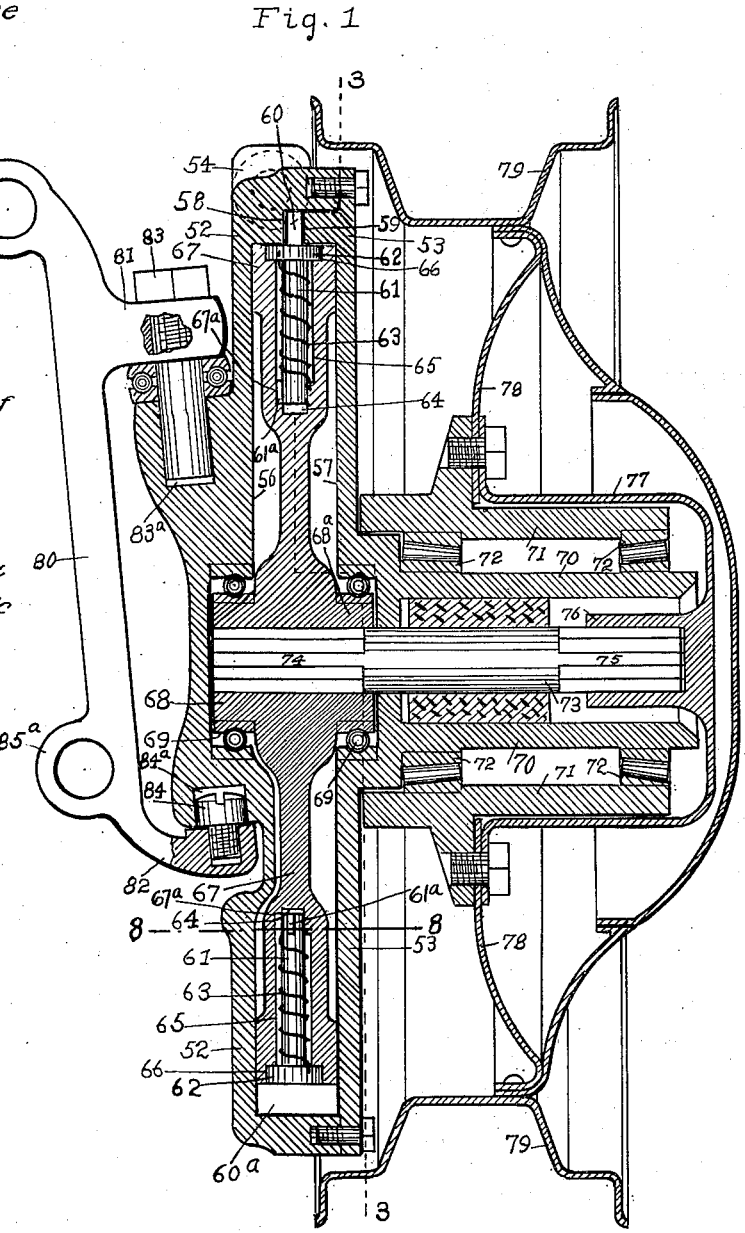
INVENTORS,
Van Lawrence Bendsil
and Louis Joseph St. John.
BY David E. Lain,
ATTORNEY.

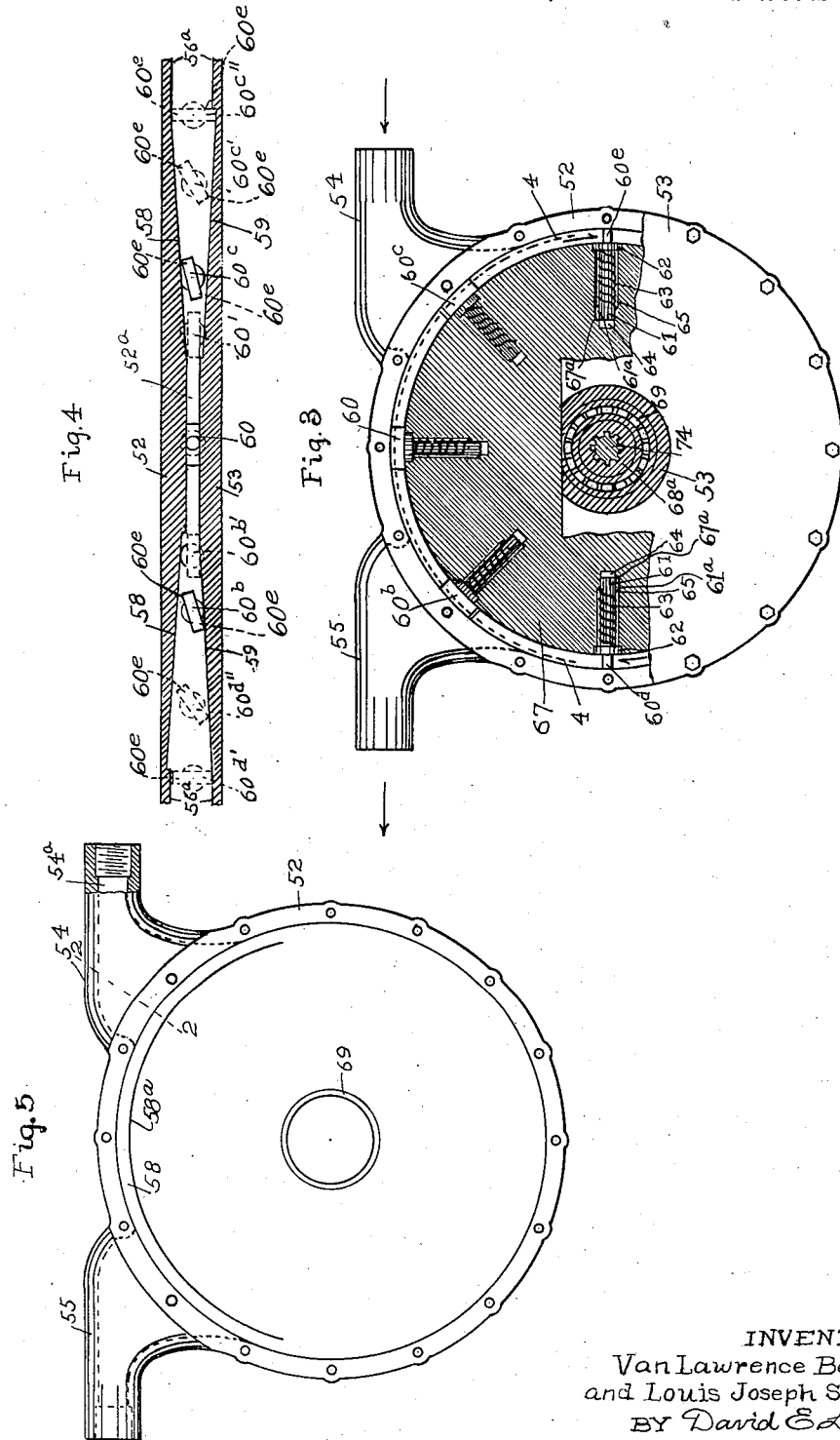

Patented Nov. 1, 1938

2,135,161

UNITED STATES PATENT OFFICE 2,135,161

ROTARY FLUID MOTOR

Van Lawrence Bendsil and Louis Joseph St. John, Bellingham, Wash.

Application November 20, 1936, Serial No. 112,085

2 Claims. (Cl. 121—67)

An application for patent for our invention was filed November 12, 1935, Serial No. 49,344, now abandoned, of which this application is a continuation in part.

Our invention relates to improvements in hydraulic rotary motors, and has for an object to provide an efficient and simple rotary fluid motor suitable for general use.

Another object of our invention is to provide a rotary fluid motor suitable for attachment to the driving wheels of an automobile to revolve the same by fluid forced to pass through the motor.

Other objects of our improvement will appear as the description proceeds.

We attain these and other objects of our invention with the mechanism illustrated in the two sheets of drawings accompanying and forming a part of this specification, in which Figure 1 is a vertical, medial, transverse section of an individual-wheel-suspension front wheel of an automobile with one of our rotary oil motors, shown in transverse, medial section, in place thereon; Fig. 2 is a cross-section view of the portion of Fig. 5 on the line 2—2 thereof, drawn on the same scale as Fig. 1; Fig. 3 is a front elevation view of our rotary motor partly in section on the bent line 3—3 of Fig. 1, drawn on a smaller scale; Fig. 4 is the developed cross-section of Fig. 3 on the arc 4—4 thereof; Fig. 5 is a front elevation view of the housing of our rotary oil motor, segregated and shown with its cover removed, drawn on a smaller scale; Fig. 6 is an elevation view of one of the similar motor-vane units, drawn on a larger scale; Fig. 7 is a bottom plan view of Fig. 6; and Fig. 8 is a plan view of that part of Fig. 1 cut by a plane through 8—8 thereof, drawn on a larger scale.

Similar characters refer to similar parts throughout. Certain parts are broken away to show other parts hidden thereby.

In the following description numbers from 9 to 51, inclusive, are not used as designating characters.

With more particular reference to designating parts: The oil rotor shown in Fig. 1 is in place and fastened on the front wheel of an automobile, but it also is suitable for mounting on and attaching to the rear wheel of an automobile with only such external changes as pertain to the means to fasten it to the rear automobile axle.

The rotor housing consists of the circular chamber structure 52, disposed next to the automobile frame, and the cover of the housing next to the automobile wheel shown at 53. The housing 52 has the inlet arm 54 and the outlet arm 55, projecting laterally from the top of the housing, but when it is desired to operate the wheel backwards, the course of oil through the rotor is reversed and enters through the arm 55 and leaves from the arm 54. The circular chamber within the said housing is of equal radial depth throughout, except at the ports where the oil enters and leaves the chamber, and of equal transverse width throughout except at the top where the width of the chamber is reduced to little more than the thickness of the vanes and is gradually widened from this narrowest part by the cam surfaces 58, 58 and 59, 59.

As illustrated, there are eight rotor vanes each fastened on the outer end of a vane post 61. The eight rotor vanes and posts are exactly similar but, for convenience of the description the vanes are given different designating characters depending on their particular location in the drawings. Rotor vane 60 is at the upper end of the chamber while rotor vane 60ª is at the lower part thereof. The upper diagonal rotor vanes 60ᵇ and 60ᶜ are shown at the left and right hand, respectively, of Fig. 3, while the rotor vanes 60ᵈ and 60ᵉ are shown at the left and right hand ends, respectively, of a horizontal diameter of the chamber. The lower diagonally disposed rotor vanes are not shown in the illustrations.

There are eight vane post holes, radially disposed and equally spaced in the transverse center of the periphery of the rotor disc 67. The rotor disc 67 has inner and outer hubs 68 and 68ª, respectively, mounted for revolution in ball bearings 69, 69, one of which is disposed in the rotor housing 52 and the other in the housing cover 53.

The vane post holes are all alike with the smallest diameter 64 at the bottom, the medium diameter 65 in the middle and the largest diameter 66 at the top. Near the bottom of each post hole, in the smallest part 64, is the sectoral enlargement 67ª.

Each of the similar vane posts has the cylindrical body 61 and the circular boss top 62, at the inner edge of the vane, which fits into the largest part 66 of the post hole. On the inner end of each vane post is the key 61ª disposed in the sectoral enlargement 67ª of the post hole. The latter is of the required size between its ends 67ᵇ and 67ᶜ, relative to the thickness of the key 61ª, to limit the oscillations of the vane and post to 90°, and is disposed to permit the vane to occupy positions in the rotor chamber at right angles with the rotor axis of revolution and also parallel with the same.

The housing cover 53 has the hollow hub 70 which mounts the hollow wheel hub 71 for revolution on roller bearings 72. The wheel hub 71 has the wheel disc 78 fastened thereto, the periphery of which is fastened on the wheel rim 79. The hub cover 77 is fastened to the hub 71 and has an inner central hub 76 in which is engaged the outer end 75 of the floating axle 73, the inner end 74 of which is engaged in the hub 68, 68ᵃ of the rotor disc 67.

The individual-wheel-suspension bracket 80 has upper and lower arms 81 and 82, respectively, from which project inwardly-inclined, aligned pins 83 and 84, respectively, to engage in the bearing holes 83ᵃ and 84ᵃ in the rotor housing 52. The bracket 80 is provided with upper and lower bolt eyes 85 and 85ᵃ respectively. The wheel 79 may oscillate on the said pins 83 and 84.

The section on the diagonal line 2—2 of Fig. 5, shown in Fig. 2, illustrates the shape of the similar rotor-housing ports in the arms 54 and 55, wherein a conduit, not shown, connected with arm 54 has conduit connection with the rotor chamber through the slot 54ᵇ, which is narrower than the thickness of the rotor vanes in order to prevent their entry or engagement therewith as they pass by the same. A similarly disposed cross-section of the port 55 also would show a narrow slot conduit connection similar to 54ᵇ between a conduit not shown but connected with port arm 55 and the rotor chamber for a similar reason.

The annular rotor chamber in which the rotor vanes revolve on the axis of the rotor disc 67 and oscillate on the axes of their posts 61 consists of opposite annular areas of the inner walls of the rotor housing 52 and rotor-housing cover 53 and the opposite circular areas of the inner peripheral wall of the said housing and the peripheral wall or surface of the said rotor disc. Through a sector of more than one half of this chamber the vanes are disposed transversely of the rotor disc and the chamber as they pass through the chamber. During this part of their revolution on the axis of the rotor disc the springs 63 tend to maintain them in the said transverse disposition. An helical spring 63 is mounted on each of the vane posts 61 and has one end fastened to the post and its other end fastened to the rotor disc 67 in a manner to tend to revolve the post in a clockwise direction on its axis as viewed from its inner end. This urge of the spring 63 tends to maintain the post key 61ᵃ against the end or stop 67ᶜ of the sectoral enlargement 67ᵃ of the post hole and, the vane 60 transversely of the rotor chamber as stated above.

As seen in Figs. 3 and 4, when a vane reaches the port 55 at the left-hand end of the dotted arc 4—4, that is, in its position shown in dotted lines at 60ᵈ' in Fig. 4, its edge which bears on the cover 53 has reached the left-hand end of the cam surface 59 and bears thereon as it moves forward, resulting in turning the vane on its post axis, against the reaction of the spring 63, till it in succession attains the dotted-line position at 60ᵈ", the solid-line position at 60ᵇ, the dotted-line position at 60ᵇ', from whence it passes into the narrowest part 52ᵃ of the chamber where the space between the housing and housing cover is little more than the thickness of the vane; thence out of this narrowest part between the diverging right-hand end of the cam surfaces 58 and 59 where it successively attains the dotted-line position at 60', the solid-line position at 60ᶜ, the dotted-line position at 60ᶜ' and then the dotted-line position at 60ᶜ" where the key 61ᵃ is again against the stop 67ᶜ. While the vane is in the narrowest part 52ᵃ of the rotor chamber, the key 61ᵃ bears on the stop 67ᵇ. To arrange for the oscillation of the vane from and to its said transverse position the beveled or rounded corners 60ᵉ and 60ᶠ are provided. The left-hand end of cam surfaces 58 and the right-hand end of cam surface 59, as shown in Fig. 4, are disposed to provide room between the ends of the passing vanes and these surfaces in order that the vanes may not engage therewith and also to allow for the passage of oil by the vanes when they are moving through these parts of the chamber.

Now assume that the rotor revolution be reversed and the vanes pass between the cam surfaces 58 and 59 from the right toward the left hand. Then, as before, the reaction of the springs 63 will cause the vanes to bear on the right-hand end of cam surface 58 and, after leaving the narrowest part of the chamber at 52ᵃ, they will bear on the left hand end of the cam surface 59 while passing through the above-described, illustrated positions.

The length of the narrowest sector 52ᵃ of the rotor chamber is long enough to insure the presence of a vane therein at all times and thus prevent oil from passing through it in a direction opposite to the vane movement.

The continuous closure of the sector 52ᵃ of the rotor chamber against the passage of oil compels the oil to move downward from the port 54, and revolve the vanes and disc in the direction of the arrows in Fig. 3, to pass out through the port 55. When the direction of oil movement is reversed and the oil enters through the port 55, the oil must move downward in the rotor chamber, moving the vanes and disc in a direction opposite to that indicated by the said arrows and leave the motor through the port 54.

Having thus disclosed our invention, what we claim as new therein and desire to secure by Letters Patent is,—

1. In a hydraulic rotary motor, a circular rotor disc, a plurality of radial post bearings in the said disc each having a segmental extension adapted to limit the oscillations of a key boss disposed therein to ninety degrees, a rotor vane post mounted for oscillation in each of said post bearings, the said key boss on the said post, and a rotor vane fastened on the outer end of the said post.

2. A hydraulic rotary motor including, a rotor housing, an annular rotor-vane chamber in the said housing having inlet and outlet ports connected therewith, said chamber being of uniform depth of cross-section and having a major portion of uniform width of cross-section, a minor portion of uniform but of less width of cross-section than the major portion and two tapering portions connecting said major and minor portions together, a circular rotor disc mounted for rotation in said housing, the periphery of which constitutes the inner wall of said annular rotor-vane chamber, having a plurality of radial rotor-vane post bearings therein, rotor-vane posts mounted for oscillation in said rotor-vane post bearings, rotor vanes fastened on the outer ends of the rotor-vane posts and disposed in the rotor-vane chamber to rotate on the axis of the rotor disc through the chamber and to rotate in each of the said tapering portions of said chamber on the axes of the rotor-vane posts, the said vanes having a depth equal to the depth of said chamber, a width equal to the width of the major portion of the chamber and a thickness equal to the width of the minor portion of said chamber, means to limit the oscillations of said vanes on the rotor-vane post axes between positions of the vanes parallel with the rotor disc axis and positions of the vanes at right angles with the axis of the rotor-vane disc, and a spring mounted on each of the rotor-vane posts fastened to the post and to the rotor disc tending to restrain the rotation of said vane on the axis of the post from its position parallel with the axis of the rotor disc, yielding to the camming action of the one tapering portion of the chamber to rotate the vane on the post axis from its said position parallel with the axis of the rotor disc to its position at right angles with the axis of the rotor disc while the vane is rotating on the axis of the rotor disc through said one tapering portion of the chamber and tending to cause said vane to rotate on the said post axis to return to its initial position parallel with said rotor disc axis while rotating through said other tapering portion of the chamber on the said rotor disc axis.

VAN LAWRENCE BENDSIL.
    LOUIS JOSEPH ST. JOHN.